Sept. 21, 1965  G. A. TINNERMAN  3,207,022

SPRING STEEL FASTENERS

Filed June 25, 1962

INVENTOR
GEORGE A. TINNERMAN

BY: Featherstonhaugh & Co
ATTORNEYS

United States Patent Office 3,207,022
Patented Sept. 21, 1965

3,207,022
SPRING STEEL FASTENERS
George A. Tinnerman, Bay Village, Ohio. (17864 Beach Road, Lakewood, Ohio); George A. Tinnerman III, guardian of said George A. Tinnerman
Filed June 25, 1962, Ser. No. 204,889
3 Claims. (Cl. 85—36)

This invention relates to spring steel fasteners.

Spring steel fasteners have previously been employed providing a sheet steel base in the form of a flat or arched spring washer surrounding prongs inclined upwardly towards one another with their free ends spaced apart for passage of a plain or screw threaded stud to be gripped thereby, thus providing a complete fastener and eliminating the necessity for separate parts such as a lock washer, etc.

The present invention relates to such a fastener but so improved that it employs the unused strength of the hitherto unused portion of the base of such a fastener and by novel prong or tongue formation struck from the base not only utilizes the unused strength of such former type of fastener but at least triples the strength characteristics of the fastener, transmitting the strength characteristics of the base directly throughout the length of the prong to its contact point with the stud to be secured thereby.

In the old type, misapplication was always possible whereas one weak point was the resistance to installation torque. Comparatively, therefore, the improved spring nut eliminates the possibility of misapplication and malfunction thereof, i.e., flattening of the prongs under thrust load and when engaged by the cooperating stud will produce an average increase greater than 50% in torque resistance upon tightening while tensile pull tests show a comparative improvement. Moreover, by employing a novel curved formation at the free terminal ends of the prongs or tongues producing a smooth bearing engagement thereof with threaded studs, not only is misapplication avoided but such bearing effect leads the prong into close and binding engagement with the root of the thread of the stud to produce a "braking action" which stops relative movement between the stud and the nut, eliminating damage to or destruction of the thread on the stud or the prongs of the nut either in use or during assembly of these cooperating parts or parts to be assembled thereby. Thus, the nut of the present invention presents a smooth bearing edge to engage the thread instead of a sharp biting edge tending to shear or damage the threads, apart from its greatly improved strength characteristics which is such that it can be used indiscriminately for most exacting fastening requirements, e.g., in aircraft, missiles, etc., and which was not possible with the old type and wherein its inadvertent application could do irreparable damage in terms of value or in terms of life.

The fastener of the present invention generally embodies a spring steel base having a pair of axially aligned prongs or tongues struck therefrom intermediate the sides and ends thereof inclining outwardly from said base towards one another and terminating in adjacent spaced apart free ends, said free ends being inwardly recessed, jointly to form a passage therebetween for a stud to be engaged thereby, each of said tongues or prongs adjacent their free ends being outwardly crowned to form a rigidifying crown surrounding each recess, said crown flaring rearwardly thereof and merging with an outwardly extending longitudinal rib formed in each tongue and extending therefrom into said base substantially beyond its line of juncture with each tongue to form a rigidifying bridge extending from said base to the terminal end of each tongue.

The invention will be clearly understood by reference to the following detailed specification taken in conjunction with the accompanying drawings.

Figure 1:
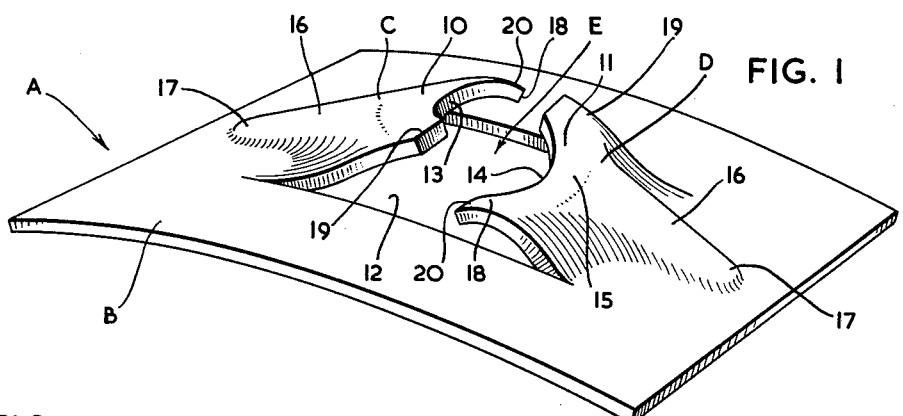
FIG. 1 is an enlarged perspective view of the fastener of the present invention.
Figure 2:
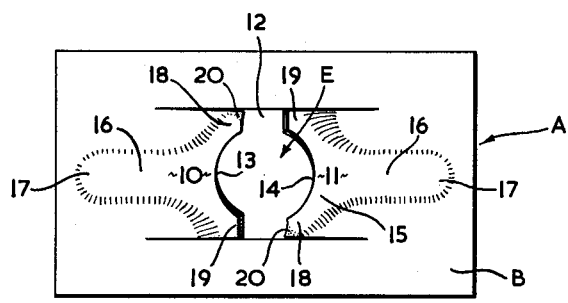
FIG. 2 is a top plan view of the fastener.
Figure 3:
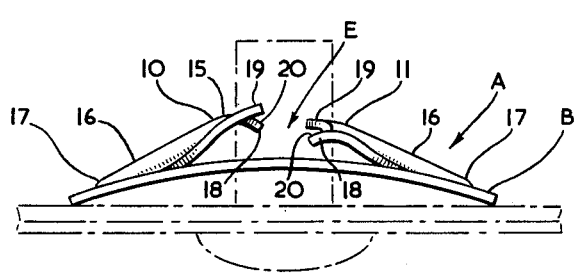
FIG. 3 is a side elevation of the fastener showing it in cooperation with (in dotted lines) a stud and elements to be fastened.
Figure 4:
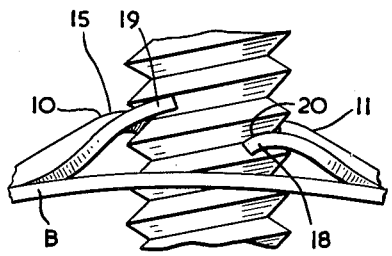
FIG. 4 is an enlarged fragmentary side elevation of the prongs and part of the base of the fastener cooperatingly engaging the threads of a screw threaded stud.

Referring to the drawings, A indicates a spring nut formed according to the present invention made preferably up of a rectangular longitudinally curved base B, of spring nut metal, from the center of which a pair of tongues C and D are struck outwardly to incline from said base towards and in opposed relation to one another, terminating in free terminal ends 10 and 11 adjacent to and spaced apart from one another and forming a main aperture 12 in the base. The free ends 10 and 11 of the tongues C and D are inwardly recessed as at 13 and 14, respectively, to provide therebetween a passage E for the passage of a stud to be engaged by the terminal ends 10 and 11 of the tongues. Each tongue surrounding its recess is outwardly concaved or crowned from its inner surface to form a rigidifying crown 15 surrounding said recesses and each tongue is formed with an outwardly rising longitudinal rib 16 which flares laterally to merge with the crown 15 and tapers rearwardly and extends to a terminal end 17 in the base B at a point substantially beyond the line of juncture between each tongue and the base plate B, thus forming a rigidifying bridge extending substantially from each end of said base to the terminal end of each tongue. This has the effect of forming a substantially stiff reinforced tongue, the strength of which stems initially from the base B, increased strengthening effect being supplemented through the continuing rib and the terminal crown 15 such that the fastener as a whole utilizes the previously unused strength of the base of a fastener of this general character and such structure has the effect of at least tripling the strength characteristics of the fastener wherein the strength characteristics of the base are employed directly throughout the length of the prong to its contact point with the stud to be secured thereby.

This spring nut may be used with a plain stud as a push-on nut but is adapted in particular to function with facility in conjunction with a screw threaded stud and transmits the work energy and/or the tensile load carrying torque resistant qualities of the sheet spring nut at the point where the terminal free ends at the passage engage the root of the thread of the stud member. The recesses 13 and 14 form at the free terminal ends of the tongues C and D a pair of spaced apart prongs 18 and 19, the prongs 18 and 19 of each tongue being offset relatively to one another from a common plane to provide in effect a spiralling thread engaging edge, and each thread engaging lead prong 18 is bent and curved inwardly in a direction towards the base to form at its outer surface a curved thread engaging bearing surface 20 which leads said prong into braking engagement with the thread at the base of the root of the stud. In consequence, the nut can be threaded on a screw threaded shank as to avoid misapplication since the curved bearing surface 20 not only functions towards a smooth and easy rotational engagement of the nut with the threaded stud and positions the prong in close binding engagement with the root of the thread, but it tends to produce a braking action which acts to stop relative movement between the stud and nut and, as compared with the sharp prong formations of the prior art, substantially eliminates the possibility of destruction or damage of the thread or the stud itself or the prong of or the sheet steel nut in use or assembly of these cooperating parts or parts to be secured by them. This compares in particular to the sharp prong formation of the prior art that had the tendency in many instances to strip the threads of the stud about the same time the prongs of the fastener turned "inside out" under stress of axial thrust and torque. Due to the uniquely strengthened character of the nut of the present invention transmitting the strength-giving qualities of the base up through the prong to the point of contact between the prong and the stud engaged thereby, I have found by actual test that such a nut even reduced in overall size by 20% without changing its thickness, will produce an average increase of torque resistance of approximately 50% upon tightening when engaged by a cooperating threaded stud while tensile pull tests are comparable. Comparing it to an ordinary sheet steel nut having a length of 1½" and a width of ⅝" used in conjunction with quarter inch diameter plain stud supporting wire rod, the average tensile pull was found to be 195 lbs. In the spring nut of the present invention of the same size and used in the same manner, the same rod held successively on four attempts by a representative test laboratory as follows:

(1) 850 lbs. tensile pull
(2) 920 lbs. tensile pull
(3) 895 lbs. tensile pull
(4) 910 lbs. tensile pull The same nut when applied to a ¼" threaded rod and tested on a Baldwin Southwork tensile testing machine, on four successive tests gave the following results:

(1) 650 lbs.
(2) 650 lbs.
(3) 675 lbs.
(4) 645 lbs.

At this point in each case, the nuts stripped the threads of the rod but the nut remained in undestroyed condition.

Accordingly, therefore, it will be clear that the improved nut of the present invention is capable of use in applications well beyond the capabilities of the spring nuts of the past. Sheet nuts of the prior art, for instance, were often unusable because of large area and which would not fit in restricted areas of uses in automotive and electronic apparatus, rockets, satellites, etc. The nut of this invention can be made 25% less in dimensional area and thickness compared to prior art fasteners while attaining greater strength, as to produce a more economical fastener.

Furthermore, the nut of the present invention, having torque values of such great degree, permits the same torque settings on power wrenches and driver as used at all times with screw threaded studs when engaged with thick screw threaded cold punched multiple thread nut members which require a high degree of tightening to resist vibration and loosening as well as assuring parts to to be joined are held in tight engagement with each other.

Moreover, due to the novel prong formation and bearing engagement thereof with the threads of a stud, the fastener when applied by such wrenches will avoid the disadvantage of spring nuts of the prior art which presented a cutting edge to the thread of a stud which in effect brought about a force or cutting action best illustrated in comparison to a cutting tool in a lathe as advanced against a bar of steel to be turned. Finally, of course, this sheet steel stud eliminates the necessity for use of spring lock washers as well as spanner washers and resultant cost in placing under nut member or over shank of stud member and, as above mentioned, it will also find greater commercial use as its overall area will more closely approximate the area of a cold punched multiple threaded nut member.

What I claim as my invention is:

1. A spring steel nut comprising a base, said base having a pair of axially aligned tongues struck therefrom and severed from the base along their sides and integral with the base only at their ends opposite their free ends, said pair of tongues inclining outwardly from said base towards one another and terminating in adjacent spaced apart free ends, said free ends being inwardly recessed to form a passage therebetween for a stud to be engaged thereby, each of said tongues adjacent their free ends being outwardly crowned to form a rigidifying crown surrounding each recess and extending completely across the free ends of the tongues, said crown flaring laterally thereof and merging with an outwardly rising longitudinal rib formed in each tongue and extending therefrom into said base substantially beyond the line of juncture of the base with each tongue to form a rigidifying bridge extending from said base to the terminal end of each tongue.

2. A spring steel nut as claimed in claim 1 in which the tongue recesses form said tongues with a pair of terminal prongs, transversely opposite prongs of said tongue being bent and curved inwardly towards said base to form a curved outer bearing surface engageable with the threads of a threaded stud.

3. A spring steel nut comprising a rectangular base having sides and ends, said base having a pair of axially aligned tongues struck therefrom and severed from the base only along their sides and integral with the base only at their ends opposite their free ends, said pair of tongues inclining outwardly from said base towards one another and terminating in adjacent spaced apart free ends, said free ends being inwardly recessed to form a passage therebetween for a stud to be engaged thereby, each of said tongues adjacent their free ends being outwardly crowned to form a rigidifying crown surrounding each recess and extending completely across the free ends of the tongues, said crown flaring laterally thereof and merging with an outwardly rising longitudinal rib formed in each tongue and extending therefrom into said base substantially beyond the lines of juncture of the base with each tongue to form a rigidifying bridge extending substantially from each end of said base to the terminal end of each tongue.

References Cited by the Examiner

UNITED STATES PATENTS

| | | | |
|---|---|---|---|
| 2,062,685 | 12/36 | Timmerman | 151—41.75 |
| 2,244,823 | 6/41 | Burke | 151—41.75 |
| 2,318,640 | 5/43 | Simmonds | 85—36 |
| 2,373,312 | 4/45 | Hughes | 85—36 |
| 2,382,936 | 8/45 | Bedford | 85—36 |
| 2,383,164 | 8/45 | Ryder | 85—36 |

FOREIGN PATENTS 971,002 6/50 France.

EDWARD C. ALLEN, *Primary Examiner.*

M. HENSON WOOD, JR., *Examiner.*